United States Patent
Glitho

(10) Patent No.: US 6,178,181 B1
(45) Date of Patent: Jan. 23, 2001

(54) MAPPING FUNCTION AND METHOD OF TRANSMITTING SIGNALING SYSTEM 7 (SS7) TELECOMMUNICATIONS MESSAGES OVER DATA NETWORKS

(75) Inventor: Roch Glitho, Montreal (CA)

(73) Assignee: Telefonaktiebolaget L M Ericsson (publ), Stockholm (SE)

(*) Notice: Under 35 U.S.C. 154(b), the term of this patent shall be extended for 0 days.

(21) Appl. No.: 08/980,740

(22) Filed: Dec. 1, 1997

(51) Int. Cl.$^7$ .................................................. H04J 3/16
(52) U.S. Cl. ............................................ 370/467; 370/469
(58) Field of Search ................................... 370/465, 466, 370/467, 469, 522, 401; 379/220, 229

(56) References Cited

U.S. PATENT DOCUMENTS

| | | | |
|---|---|---|---|
| 5,351,237 | 9/1994 | Shinohara et al. | 370/58.3 |
| 5,661,790 * | 8/1997 | Hsu | 379/220 |
| 5,737,404 * | 4/1998 | Segal | 370/401 |
| 5,774,695 * | 6/1998 | Autrey et al. | 395/500 |
| 5,793,771 * | 8/1998 | Darland et al. | 370/467 |
| 5,844,896 * | 12/1998 | Marks et al. | 379/220 |
| 5,870,565 * | 2/1999 | Glitho | 370/401 |
| 5,923,659 * | 7/1999 | Curry et al. | 370/401 |

FOREIGN PATENT DOCUMENTS

WO 96/00468  1/1996  (WO).

OTHER PUBLICATIONS

Adrian E. Conway, Queuing Network Modeling of Signaling System No. 7, IEEE, pp. 0552–0558, 1990.*
Bijan Jabbari, Routing and Congestion Control in Common Channel Signaling System No. 7, IEEE, pp. 607–614, 1992.*
David McMillan and Michael Rumsewicz, Analysis of Congestion Control for SCCP Traffic & the Impact on Intelligent Network Services, IEEE, 1990.*

* cited by examiner

Primary Examiner—Melvin Marcelo
Assistant Examiner—Phuongchau Ba Nguyen
(74) Attorney, Agent, or Firm—Smith, Danamraj & Youst, P.C.

(57) ABSTRACT

A mapping function and method for mapping a Signaling System 7 (SS7) telecommunication signaling message from a Signaling Connection Control Part (SCCP) protocol layer to an Internet Protocol (IP) protocol layer in order to transmit the SS7 signaling message over a data network from an origination node to a destination node. The mapping function receives the SS7 signaling message from the SCCP protocol layer by sending and receiving Message Transfer Protocol (MTP) primitives from the mapping function to the SCCP protocol layer. The mapping function then maps the received SS7 signaling message into an IP message by mapping MTP primitives into IP primitives, mapping the SS7 message address into an IP message address, and utilizing a user interface to set IP protocol parameters that cannot be transferred by the SCCP protocol layer. The mapping function then sends the mapped IP message to the IP protocol layer by sending and receiving IP primitives from the mapping function to the IP protocol layer.

22 Claims, 3 Drawing Sheets

MAPPING FUNCTION AND METHOD OF TRANSMITTING SIGNALING SYSTEM 7 (SS7) TELECOMMUNICATIONS MESSAGES OVER DATA NETWORKS

BACKGROUND OF THE INVENTION

1. Technical Field of the Invention

This invention relates to radio telecommunication systems and, more particularly, to a mapping function and method of transmitting Signaling System 7 (SS7) telecommunications messages over data networks.

2. Description of Related Art

In existing radio telecommunications networks, there is sometimes a requirement to carry a large amount of data from one node in the network to another. For example, in a network in which there is a primary home location register (HLR) and a backup HLR, the primary HLR may lose its data. The data must then be transferred from the backup HLR to the primary HLR to restore the primary data. The data is sent as SS7 messages utilizing the SS7 Message Transfer Protocol (MTP) which, in the prior art, may be carried either by the SS7 signaling network, or according to Telecommunication Industry Association (TIA) specification, by an X.25 data link network. The transfer of this much data, however, puts a large load on the X.25 data link network, and if the SS7 signaling network is utilized for the transfer, the operator incurrs increased cost, and there is less signaling bandwidth available for call-related SS7 signaling. Therefore, an alternate way to transfer the data from the backup HLR to the primary HLR is needed.

Although there are no known prior art teachings of a solution to the aforementioned deficiency and shortcoming such as that disclosed herein, U.S. Pat. No. 5,351,237 to Shinohara et al. (Shinohara) and PCT Patent Application WO 96/00468 by Galloway (Galloway) discuss subject matter that bears some relation to matters discussed herein. Shinohara discloses a data network system comprising a plurality of local area networks (LANs) connected to an Integrated Services Digital Network (ISDN) via a plurality of routers. The routers are each capable of automatically creating a table for storing routing information. The invention in Shinohara relates strictly to data communication networks, and provides each router with routing address information relating to all the other routers in the data network system. Shinohara does not teach or suggest a method of mapping signaling messages in the SS7 Signaling Connection Control Part (SCCP) protocol to data messages in the IP protocol.

Galloway discloses a lightweight transport protocol which tunnels point-to-point protocol (PPP) data packets between one or more source nodes and a gateway node through an imperfect mesh network (IMN) without requiring the exchange of acknowledgement packets. The gateway node is in a network employing the IP protocol. The invention in Galloway relates strictly to data communication networks, and recognizes that acknowledgement packets are not required at the IP layer when data transport protocols at higher levels utilize acknowledgement packets to assure reliable communications. Galloway does not teach or suggest a method of mapping signaling messages in the SS7 SCCP protocol to data messages in the IP protocol.

Review of each of the foregoing references reveals no disclosure or suggestion of a system or method such as that described and claimed herein. It would be advantageous, therefore, to have a mapping function for mapping signaling messages in the SS7 SCCP protocol to data messages in the IP protocol. The present invention provides such a mapping function and method.

SUMMARY OF THE INVENTION

In one aspect, the present invention is a method of modifying a signaling protocol stack to transmit a Signaling System 7 (SS7) telecommunications message over a data network from an origination node to a destination node. The signaling protocol stack includes a Signaling Connection Control Part (SCCP) protocol layer on top of a Message Transfer Protocol (MTP) protocol layer. The method includes the steps of replacing the MTP protocol layer with an Internet Protocol (IP) protocol layer, adding a SCCP-IP mapping function between the SCCP protocol layer and the IP protocol layer, and mapping the SS7 signaling message from the SCCP protocol layer in the origination node into an IP message utilizing the SCCP-IP mapping function. The method continues by sending the IP message over the data network from the origination node to the destination node, and mapping the IP message from the IP protocol layer in the destination node into the SS7 signaling message utilizing the SCCP-IP mapping function.

In another aspect, the present invention is a mapping function for mapping a SS7 telecommunication signaling message from a SCCP protocol layer to an IP protocol layer in order to transmit the SS7 signaling message over a data network from an origination node to a destination node. The mapping function includes means for receiving the SS7 signaling message from the SCCP protocol layer by sending and receiving MTP primitives from the mapping function to the SCCP protocol layer, and means for mapping the received SS7 signaling message into an IP message. The mapping means includes means for mapping MTP primitives into IP primitives, a mapping table for mapping the SS7 message address into an IP message address, and a user interface for setting IP protocol parameters that cannot be transferred by the SCCP protocol layer. The mapping function also includes means for sending the mapped IP message to the IP protocol layer by sending and receiving IP primitives from the mapping function to the IP protocol layer.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The Open Systems Interconnection (OSI) model is an internationally accepted framework of standards for communication between different systems manufactured by different vendors. The OSI model creates an open systems networking environment where any vendor's computer system, connected to any network, freely shares data with any other computer system on that network or a linked network.

Figure 1:
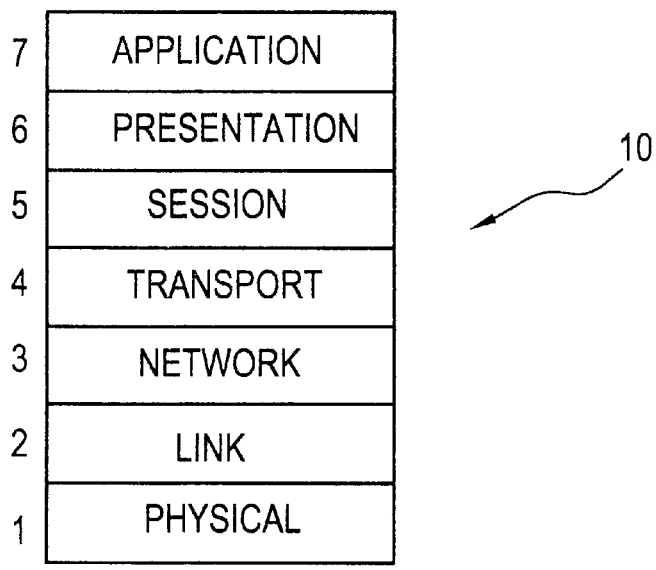
FIG. 1 (Prior Art) is an illustrative block diagram of an existing generic OSI stack illustrating the seven layers of the OSI model.

The OSI model organizes the communication process into seven different layers of interrelated protocols in a layered sequence based on their relation to the user. FIG. 1 is an illustrative block diagram of an existing generic OSI stack 10 illustrating the seven layers of the OSI model. Layers 1 through 3 deal with network access and layers 4 through 7 deal with end-to-end communications between the message source and the message destination. Each layer includes at least one function that is contained between an upper and a lower logical boundary. The services of each layer are combined with the services of lower layers to create new services that are made available to the higher layers. The layers are as follows:

- Layer 1 is a physical layer that provides transmission of signals and the activation and deactivation of physical connections;
- Layer 2 is a data link layer that includes signal synchronization, error correction, sequencing, and flow control. This layer also provides a data transmission link across one or several physical connections;
- Layer 3 is a network layer that provides routing and switching functions;
- Layer 4 is a transport layer utilizing layers 1 to 3 to provide an end-to-end service having required characteristics for the higher layer functions;
- Layer 5 is a session layer that provides the means to establish a session connection and to support an orderly exchange of data and related control functions for a particular communication service;
- Layer 6 is a presentation layer that provides means for data formatting and code conversion; and
- Layer 7 is an application layer, the protocols of which provide the actual service sought by an end user.

Figure 2:
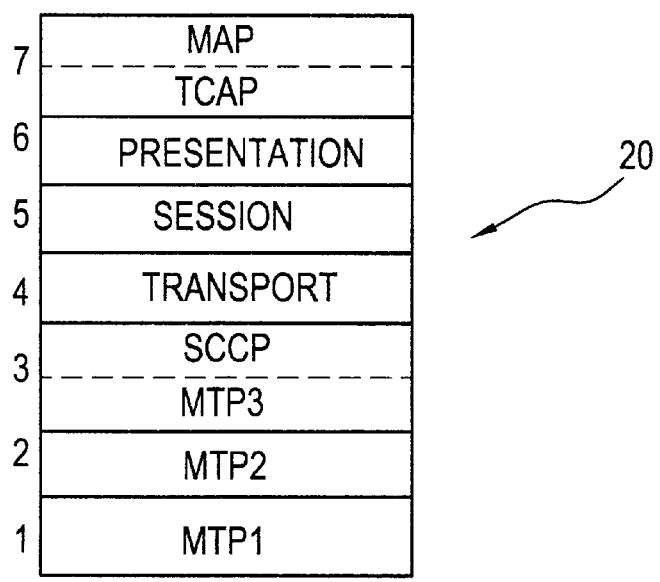
FIG. 2 (Prior Art) is an illustrative block diagram of an existing signaling protocol stack for a telecommunications application.

FIG. 2 is an illustrative block diagram of an existing signaling protocol stack for a telecommunications application. Existing communication links utilized for linking standard telecommunications systems generally comprise computing software that executes and assembles OSI layers 3–7 and transmission hardware that executes OSI layers 1–2. The application layer 7 may be a combination of a Transaction Capabilities Application Part (TCAP) application and a Mobile Application Part (MAP) application. The TCAP and MAP application and the presentation and session layers are supported by a Signaling Connection Control Part (SCCP). The SCCP layer runs on top of a Message Transfer Protocol (MTP) layer which performs SS7 routing and switching functions. The MTP layer may be broken down functionally into three layers (MTP1 through MTP3) which support the SCCP.

Figure 3:
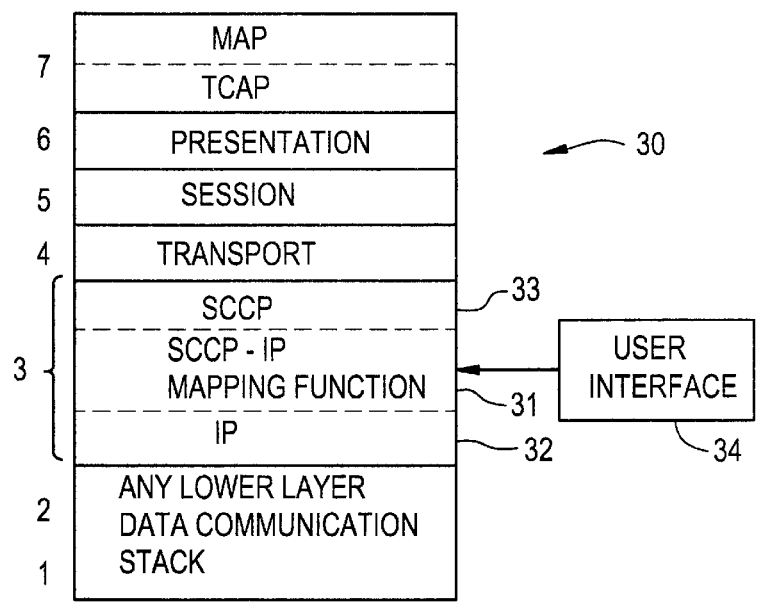
FIG. 3 is an illustrative block diagram of a telecommunications protocol stack modified in accordance with the teachings of the present invention.

FIG. 3 is an illustrative block diagram of a telecommunications protocol stack 30 modified in accordance with the teachings of the present invention. The present invention allows SS7 messages to be carried over any data communication network. The present invention utilizes the Internet Protocol (IP) and the fact that the IP protocol generally may be transmitted over any type of data communication network, for example, Ethernet, Token Ring, ATM, etc. The heart of the invention is a SCCP-IP Mapping Function 31 between the IP protocol layer 32 and the SCCP layer 33. The SCCP-IP Mapping Function 31 enables the SCCP layer to access IP primitives (e.g., "Send" and "Receive"), and maps IP control messages into SS7 MTP control messages. The IP protocol has different characteristics than the SS7 MTP protocol. Therefore, the mapping must be performed with some intelligence in the mapping function. A user interface 34 enables the system operator to set up an address mapping table, and to set various IP protocol parameters which cannot be transferred by the SCCP layer.

The SCCP-IP Mapping Function 31 may perform one-to-one translations between IP layer primitives and MTP layer primitives, and one-to-many translations. However, some primitives in each layer cannot be converted. In those cases, the present invention generates a pseudo response. Since the SCCP layer normally runs on top of the MTP layer in a telecommunications protocol stack, the SCCP-IP Mapping Function must mimic the MTP layer in its interactions with the SCCP layer in order for the conversion to the IP protocol to be transparent to the higher telecommunications protocol layers.

Figure 4:
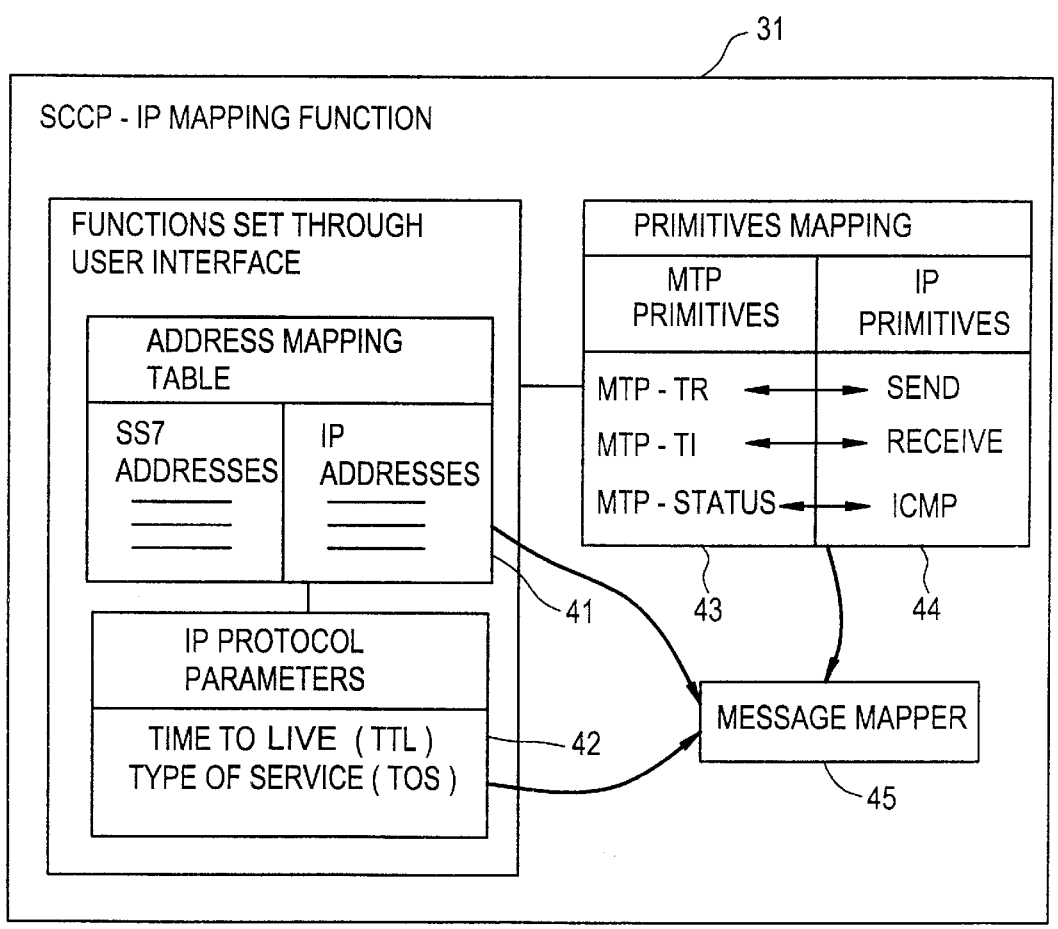
FIG. 4 is a functional block diagram of the SCCP-IP Mapping Function of the present invention.

FIG. 4 is a functional block diagram of the SCCP-IP Mapping Function 31 of the present invention. The user interface 34 to the SCCP-IP Mapping Function 31 enables the system operator to set up an address mapping table 41, and to set various IP protocol parameters which cannot be transferred by the SCCP layer. The SS7 application which runs on top of the protocol stack is not aware that the messages are being transferred to the destination node by the IP protocol. Therefore, the SS7 application sends its messages to the SCCP layer with destinations having SS7 addresses. The SCCP layer then passes the messages with SS7 addresses to the SCCP-IP Mapping Function 31. Within the SCCP-IP Mapping Function, the mapping table 41 maps the SS7 addresses to IP addresses. Each node in the communication network has both an SS7 address and an IP address. The operator configures the mapping table to map the addresses.

The user interface 34 also enables the system operator to set various IP protocol parameters 42 which cannot be transferred by the SCCP layer. The first IP parameter set through the user interface is called Time To Live (TTL). The TTL parameter tells the IP network that if a message has not been delivered after a time period specified by the TTL parameter, then the message should be discarded. The TTL parameter is not known by the SCCP layer. In addition, the concept of discarding a message after a specified time period is not supported by the MTP layer. Therefore, the operator must configure this parameter.

The second IP parameter that is set through the user interface is called Type Of Service (TOS). TOS indicates the type of service to be expected. The TOS parameter is not known by the SCCP layer. In the preferred embodiment of the present invention, the operator should set the TOS parameter to "no delay" and "high reliability". The TTL and TOS parameters are utilized by the SCCP-IP Mapping Function 31 to reformat the SS7 messages received from the SCCP layer, in order to send them through the IP network.

The SCCP-IP Mapping Function 31 maps certain MTP primitives 43 into IP primitives 44 in order to transport data messages over the IP network. The SCCP layer 33 expects to receive certain primitives from the MTP layer (FIG. 2) during normal signaling messaging. These primitives are (1) MTP Transfer Request primitive (MTP-TR); (2) MTP Transfer Indication primitive (MTP-TI); (3) MTP Pause primitive; (4) MTP Resume primitive; and (5) MTP Status primitive. The SCCP layer utilizes the MTP-TR primitive to request the MTP layer to transfer a message. The MTP layer utilizes the MTP-TI primitive to indicate to the SCCP layer that a message has been received. The MTP layer utilizes the MTP Pause primitive to indicate to the SCCP layer that the MTP layer is unable to transfer messages to a given destination. The MTP layer utilizes the MTP Resume primitive to indicate to the SCCP layer that the MTP layer can now transfer messages to the given destination. The MTP layer utilizes the MTP Status primitive to indicate to the SCCP layer that the MTP layer is partially unable to transfer messages to a given destination. The MTP-TR, MTP-TI, and MTP Resume primitives are mapped into IP primitives in the SCCP-IP Mapping Function 31. The MTP Pause primitive and the MTP resume primitive have no equivalent in the IP protocol, and are not mapped. Their handling is discussed below.

When an SS7 message is received in the SCCP-IP Mapping Function from the SCCP layer, the MTP-TR primitive is mapped into the IP primitive "Send" in the message mapper 45. The SS7 address is mapped to the IP address in the mapping table 41, and sent to the message mapper where the IP address is placed in the Send primitive along with the TTL and TOS parameters 42, and the data received in the message from the SCCP layer.

The MTP-TI primitive is mapped into the IP primitive "Receive". When a destination node receives an IP message, the Receive primitive is generated by the IP layer and sent to the SCCP-IP Mapping Function 31 where the Receive primitive is mapped to the MTP-TI primitive which is understood by the SCCP layer above. The Receive primitive includes the data received from the SCCP layer at the origination node.

As noted above, the MTP primitives MTP Pause (no data can be transferred) and MTP resume (data can be transferred) have no equivalent in the IP protocol. Therefore, they cannot be transported by the IP network, and the destination SCCP layer cannot receive them. However, the SCCP-IP Mapping Function 31 maps the MTP Status primitive (partially unable to deliver data) into the IP message known as an Internet Control Message Protocol (ICMP) message. ICMP messages typically report errors in the processing of datagrams, and may be sent in several situations. For example, the ICMP message is sent to the originating node when a message cannot reach its destination. Thus, the SCCP-IP Mapping Function generates a pseudo response to support the reporting of message status.

Figure 5:
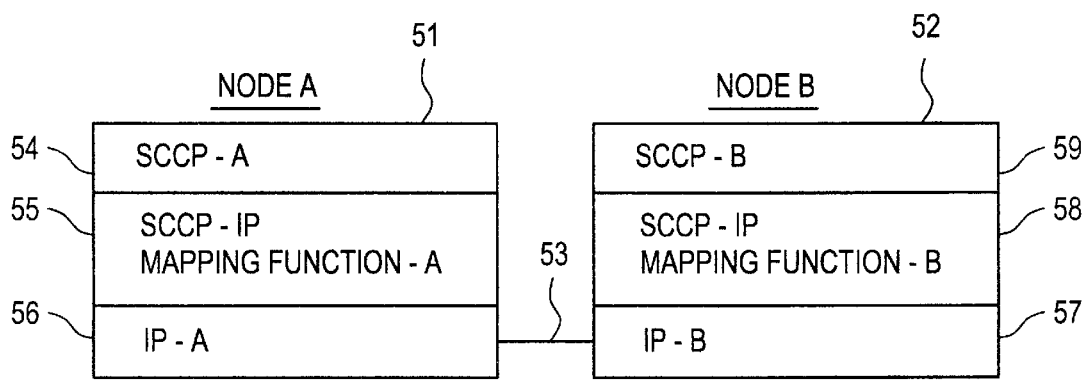
FIG. 5 illustrates an exemplary communication of data from a first telecommunication node to a second telecommunication node utilizing the IP protocol for message transfer in accordance with the teachings of the present invention.

FIG. 5 illustrates an exemplary communication of a data message from a first telecommunication node (Node A) 51 to a second telecommunication node (Node B) 52 utilizing an IP network 53 for message transfer. For simplicity, only the SCCP layer, the SCCP-IP Mapping Function, and the IP layer have been shown for each node. With reference to FIGS. 4 and 5, the message transfer will now be described. The SCCP layer in Node A (SCCP-A) 54 sends a MTP-TR primitive to the SCCP-IP Mapping Function-A 55. The MTP-TR primitive is normally utilized to request a MTP layer to transfer a SS7 message. The SCCP-IP Mapping Function-A pulls the SS7 destination address from the message and maps the SS7 destination address (in this case, SCCP-B 59) to the corresponding IP destination address (in this case, IP-B 57) utilizing the address mapping table 41. The SCCP-IP Mapping Function-A then adds the IP protocol parameters TTL and TOS 42 to the message. The TTL and TOS parameters are placed in the Send IP primitive and are sent to the IP-A layer 56. The destination address in the Send primitive is IP-B 57.

The message then goes through the IP network 53 from the IP-A layer 56 in Node A 51 to the IP-B layer 57 in Node B 52. At the IP-B layer, the Receive primitive is sent to the SCCP-IP Mapping Function-B 58. The Receive primitive includes the message data, the TTL and TOS parameters 42, and the IP destination address (IP-B) 57. The SCCP-IP Mapping Function-B 58 maps the IP address (IP-B) to the corresponding SS7 address (SCCP-B) 59 utilizing its address mapping table, and passes the data up to the SCCP-B layer 59 by removing the TTL and TOS IP parameters and reformatting the data using the MTP-TI primitive which indicates to the SCCP-B layer that data has been received.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of modifying a signaling protocol stack to transmit a Signaling System 7 (SS7) telecommunication signaling message over a data network from an origination node to a destination node, said signaling protocol stack having a Signaling Connection Control Part (SCCP) protocol layer on top of a Message Transfer Protocol (MTP) protocol layer, said method comprising the steps of:

replacing the MTP protocol layer with an Internet Protocol (IP) protocol layer;

adding a SCCP-IP mapping function between the SCCP protocol layer and the IP protocol layer;

mapping the SS7 signaling message from the SCCP protocol layer in the origination node into an IP message utilizing the SCCP-IP mapping function; and sending the IP message over the data network from the origination node to the destination node.

2. The method of modifying a signaling protocol stack to transmit a SS7 signaling message over a data network of claim 1 wherein said step of mapping the SS7 signaling message from the SCCP protocol layer in the origination node into an IP message utilizing the SCCP-IP mapping function includes mapping the SS7 message address into an IP message address.

3. A method of modifying a signaling protocol stack to transmit a Signaling System 7 (SS7) telecommunication signaling message over a data network from an origination node to a destination node, said signaling protocol stack having a Signaling Connection Control Part (SCCP) protocol layer on top of a Message Transfer Protocol (MTP) protocol layer, said method comprising the steps of:

replacing the MTP protocol layer with an Internet Protocol (IP) protocol layer;

adding a SCCP-IP mapping function between the SCCP protocol layer and the IP protocol layer;

mapping the SS7 signaling message from the SCCP protocol layer in the origination node into an IP message utilizing the SCCP-IP mapping function, said mapping step including the steps of:

mapping an SS7 message address into an IP message address; and providing a user interface which enables a system operator to configure an address mapping table within the SCCP-IP mapping function; and sending the IP message over the data network from the origination node to the destination node.

4. The method of modifying a signaling protocol stack to transmit a SS7 signaling message over a data network of claim 3 wherein said step of providing a user interface includes providing a user interface which enables the system operator to set IP protocol parameters that cannot be transferred by the SCCP protocol layer.

5. The method of modifying a signaling protocol stack to transmit a SS7 signaling message over a data network of claim 4 wherein said step of providing a user interface which enables the system operator to set IP protocol parameters that cannot be transferred by the SCCP protocol layer includes providing a user interface which enables the system operator to set a Time To Live (TTL) IP protocol parameter and a Type of Service (TOS) IP protocol parameter.

6. A method of modifying a signaling protocol stack to transmit a Signaling System 7 (SS7) telecommunication signaling message over a data network from an origination node to a destination node, said signaling protocol stack having a Signaling Connection Control Part (SCCP) protocol layer on top of a Message Transfer Protocol (MTP) protocol layer, said method comprising the steps of:

replacing the MTP protocol layer with an Internet Protocol (IP) protocol layer;

adding a SCCP-IP mapping function between the SCCP protocol layer and the IP protocol layer;

mapping the SS7 signaling message from the SCCP protocol layer in the origination node into an IP message utilizing the SCCP-IP mapping function, said mapping step including mapping MTP primitives into IP primitives; and sending the IP message over the data network from the origination node to the destination node.

7. The method of modifying a signaling protocol stack to transmit a SS7 signaling message over a data network of claim 6 wherein said step of mapping MTP primitives into IP primitives includes the steps of:

mapping a MTP Transfer Request (MTP-TR) primitive into an IP Send primitive; and mapping a MTP Transfer Indication (MTP-TI) primitive into an IP Receive primitive.

8. The method of modifying a signaling protocol stack to transmit a SS7 signaling message over a data network of claim 7 wherein said step of mapping MTP primitives into IP primitives further comprises mapping a MTP Status primitive into an Internet Control Message Protocol (ICMP) message.

9. A method of modifying a signaling protocol stack to transmit a Signaling System 7 (SS7) telecommunication signaling message over a data network from an origination node to a destination node, said signaling protocol stack having a Signaling Connection Control Part (SCCP) protocol layer on top of a Message Transfer Protocol (MTP) protocol layer, said method comprising the steps of:

replacing the MTP protocol layer with an Internet Protocol (IP) protocol layer;

adding a SCCP-IP mapping function between the SCCP protocol layer and the IP protocol layer;

mapping the SS7 signaling message from the SCCP protocol layer in the origination node into an IP message utilizing the SCCP-IP mapping function;

sending the IP message over the data network from the origination node to the destination node; and mapping, in the destination node, the IP message from the IP protocol layer into the SS7 signaling message utilizing the SCCP-IP mapping function.

10. A method of modifying a signaling protocol stack to transmit a Signaling System 7 (SS7) signaling message over a data network from an origination node to a destination node, said signaling protocol stack having a Signaling Connection Control Part (SCCP) protocol layer on top of a Message Transfer Protocol (MTP) protocol layer, said method comprising the steps of:

replacing the MTP protocol layer with an Internet Protocol (IP) protocol layer;

adding a SCCP-IP mapping function between the SCCP protocol layer and the IP protocol layer;

mapping the SS7 signaling message from the SCCP protocol layer in the origination node into an IP message utilizing the SCCP-IP mapping function, said step of mapping the SS7 message into the IP message including the steps of:

mapping the SS7 message address into an IP message address to enable the mapped message to be transported over an IP network to the destination node;

mapping MTP primitives into IP primitives to enable the mapped message to transport data over the IP network to the IP message address; and setting a Time To Leave (TTL) IP protocol parameter and a Type of Service (TOS) IP protocol parameter to provide required IP protocol parameters to the mapped message that the SCCP protocol layer cannot transfer from the SS7 signaling message to the SCCP-IP mapping function; and sending the IP message over the data network from the origination node to the destination node.

11. The method of modifying a signaling protocol stack to transmit a SS7 signaling message over a data network of claim 10 wherein said step of mapping MTP primitives into IP primitives includes the steps of:

mapping a MTP Transfer Request (MTP-TR) primitive into an IP Send primitive; and mapping a MTP Transfer Indication (MTP-TI) primitive into an IP Receive primitive.

12. The method of modifying a signaling protocol stack to transmit a SS7 signaling message over a data network of claim 11 wherein said step of sending the IP message over the data network from the origination node to the destination node includes configuring the IP message through the steps of:

placing the mapped IP address in the IP Send primitive;

adding the TTL and TOS parameters to the IP Send primitive; and adding data from the SS7 message to the IP Send primitive.

13. The method of modifying a signaling protocol stack to transmit a SS7 signaling message over a data network of claim 10 further comprising mapping, in the destination node, the IP message from the IP protocol layer into the SS7 signaling message utilizing the SCCP-IP mapping function, said step of mapping the IP message into the SS7 message including the steps of:

mapping the IP message address into the SS7 message address; and mapping IP primitives into MTP primitives.

14. The method of modifying a signaling protocol stack to transmit a SS7 signaling message over a data network of claim 13 wherein said step of mapping IP primitives into MTP primitives includes the steps of:

mapping the IP Send primitive into the MTP Transfer Request (MTP-TR) primitive; and mapping the IP Receive primitive into the MTP Transfer Indication (MTP-TI) primitive.

15. A mapping function for mapping a Signaling System 7 (SS7) signaling message from a Signaling Connection Control Part (SCCP) protocol layer to an Internet Protocol (IP) protocol layer in order to transmit the SS7 signaling message over a data network from an origination node to a destination node, said mapping function comprising:

- means for receiving the SS7 signaling message from the SCCP protocol layer, said means for receiving the SS7 signaling message including means for sending and receiving Message Transfer Protocol (MTP) primitives from the mapping function to the SCCP protocol layer;
- means for mapping the received SS7 signaling message into an IP message; and
- means for sending the mapped IP message to the IP protocol layer.

16. The mapping function of claim 15 wherein said means for sending the mapped IP message to the IP protocol layer includes means for sending and receiving IP primitives from the mapping function to the IP protocol layer.

17. The mapping function of claim 16 wherein said means for mapping the received SS7 signaling message into an IP message includes means for mapping MTP primitives into IP primitives.

18. A mapping function for mapping a Signaling System 7 (SS7) signaling message from a Signaling Connection Control Part (SCCP) protocol layer to an Internet Protocol (IP) protocol layer in order to transmit the SS7 signaling message over a data network from an origination node to a destination node, said mapping function comprising:

- means for receiving the SS7 signaling message from the SCCP protocol layer, said means for receiving the SS7 signaling message including means for sending and receiving Message Transfer Protocol (MTP) primitives from the mapping function to the SCCP protocol layer;
- means for mapping the received SS7 signaling message into an IP message, said means for mapping the received SS7 signaling message into an IP message including:
  - means for mapping MTP primitives into IP primitives, said means for mapping MTP primitives into IP primitives including:
    - means for mapping a MTP Transfer Request (MTP-TR) primitive into an IP Send primitive and for mapping a MTP Transfer Indication (MTP-TI) primitive into an IP Receive primitive; and
- means for sending the mapped IP message to the IP protocol layer, said means for sending the mapped IP message to the IP protocol layer including means for sending and receiving IP primitives from the mapping function to the IP protocol layer.

19. A mapping function for mapping a Signaling System 7 (SS7) signaling message from a Signaling Connection Control Part (SCCP) protocol layer to an Internet Protocol (IP) protocol layer in order to transmit the SS7 signaling message over a data network from an origination node to a destination node, said mapping function comprising:

- means for receiving the SS7 signaling message from the SCCP protocol layer, said means for receiving the SS7 signaling message including means for sending and receiving Message Transfer Protocol (MTP) primitives from the mapping function to the SCCP protocol layer;
- means for mapping the received SS7 signaling message into an IP message, said means for mapping the received SS7 signaling message into an IP message includes a mapping table for mapping the SS7 message address into an IP message address; and
- means for sending the mapped IP message to the IP protocol layer.

20. The mapping function of claim 19 wherein said means for mapping the received SS7 signaling message into an IP message includes a user interface for setting IP protocol parameters that cannot be transferred by the SCCP protocol layer.

21. The mapping function of claim 20 wherein said IP protocol parameters include a Time To Live (TTL) IP protocol parameter and a Type of Service (TOS) IP protocol parameter.

22. A mapping function for mapping a Signaling System 7 (SS7) signaling message from a Signaling Connection Control Part (SCCP) protocol layer to an Internet Protocol (IP) protocol layer in order to transmit the SS7 signaling message over a data network from an origination node to a destination node, said mapping function comprising:

- means for receiving the SS7 signaling message from the SCCP protocol layer by sending and receiving Message Transfer Protocol (MTP) primitives from the mapping function to the SCCP protocol layer;
- means for mapping the received SS7 signaling message into an IP message, said mapping means including:
  - means for mapping MTP primitives into IP primitives;
  - a mapping table for mapping the SS7 message address into an IP message address; and
  - a user interface for setting a Time To Live (TTL) IP protocol parameter and a Type of Service (TOS) IP protocol parameter; and
- means for sending the mapped IP message to the IP protocol layer by sending and receiving IP primitives from the mapping function to the IP protocol layer.

* * * * *